Dec. 19, 1933.    P. DE MATTIA    1,939,670
VULCANIZING PRESS
Filed April 21, 1928    4 Sheets-Sheet 1

INVENTOR
Peter De Mattia
BY
Rogers, Campbell
ATTORNEYS

Dec. 19, 1933.  P. DE MATTIA  1,939,670

VULCANIZING PRESS

Filed April 21, 1928  4 Sheets-Sheet 2

INVENTOR
Peter De Mattia
BY
ATTORNEYS

Dec. 19, 1933.    P. DE MATTIA    1,939,670
VULCANIZING PRESS
Filed April 21, 1928    4 Sheets-Sheet 4

INVENTOR
Peter De Mattia
By Rogers, Kennedy &
Campbell ATTORNEYS

Patented Dec. 19, 1933

1,939,670

UNITED STATES PATENT OFFICE 1,939,670

VULCANIZING PRESS

Peter De Mattia, Passaic, N. J., assignor, by mesne assignments, to National Rubber Machinery Company, Akron, Ohio, a corporation of Ohio Application April 21, 1928. Serial No. 271,695

16 Claims. (Cl. 18—17)

This invention relates to vulcanizing apparatus, and refers particularly to vulcanizing presses for use in the production of inner tubes, pneumatic tires, and similar articles.

An important object of the present invention is to provide a vulcanizing press which is capable of holding interchangeable mold sections of different sizes whereby to reduce the equipment cost and floor space necessary for a vulcanizing plant.

Another object is to provide such a press with novel power mechanism for opening and closing the device, and with manual control means for operating said mechanism in suitable timed relation to the inflation and deflation of the article within the mold.

Specifically, the invention contemplates a vulcanizing press which comprises a pair of opposed platens or holding members hingedly connected together and adapted to detachably support a pair of opposed annular mold sections. The mold sections are grooved in their meeting faces whereby to define between them a mold cavity within which the article being vulcanized is confined and subjected to heat and pressure, the heat being supplied by steam or the like circulated thru jackets which surround the mold cavity, and the pressure being applied by inflating the article in the mold cavity. In order to swing one of the platens with reference to the other, power mechanism is provided, which includes a rocking pressure cylinder connected by means of a piston rod to one arm of a bell-crank, the other arm of which is connected by a link to the swinging platen. This power mechanism is capable of limited lost motion with reference to the swinging platen and has constantly connected with it novel mechanism for locking and unlocking the press. Such locking mechanism comprises a lever to which the end of the previously mentioned link is connected, said lever being secured to a rock shaft which is journaled on the swinging platen, and a clamping member which is suspended on eccentrics on the rock shaft. The clamping member is adapted to engage a locking lug on the fixed platen and to draw the two platens together with a powerful clamping pressure when the press is closed, and to disengage said locking lug to permit opening of the press, these locking and unlocking actions taking place automatically and practically simultaneously with the closing and opening of the press by the pressure cylinder.

Another feature of the invention resides in the provision of a safety dog or latch which, when the press is opened, will engage a cooperating member to hold the swinging platen in its open position in case the pressure cylinder fails or is prematurely operated to close the press. This dog or latch is preferably pivoted on the bell-crank at the rear of the press so that, as the movable mold section is swung up to its open position, the dog swings by gravity below a shoulder on the upper end of the pressure cylinder. A longitudinally slidable rod extends beneath the press from a position adjacent the pressure cylinder to the front of the apparatus where it is convenient for manipulation by the operator, and by sliding this rod rearwardly the dog can be released or rendered inactive.

Another feature of the invention resides in means to synchronize the operation of the press with the inflation and deflation of the tube. This is accomplished by providing separate manually controlled valves for the pressure cylinder and for the inflation and deflation devices, and by establishing an interlocking connection between the valves which will necessitate their operation in a definite sequence. The valve for admitting and exhausting pressure fluid to and from the opposite ends of the pressure cylinder, whereby to open and close the press, is controlled by a fore-and-aft rod or bar which is slidable below the press and in a plane transverse to that of the operating lever of the tube inflation valve. This rod or bar is provided with a notch which, when the press is closed, receives a key or keeper associated with the inflation valve handle, whereby to hold the bar against the action of a tension spring tending to draw the same rearwardly. In order to remove said key or keeper from the notch, it is necessary to first turn the inflation valve handle to a position in which the article becomes deflated, after which the fore-and-aft bar is moved rearwardly to cause the press to be unlocked and opened. After the press is again closed and locked, which necessitates the drawing forward of the fore-and-aft bar, the operating lever for the inflation valve is actuated to inflate the tube and by the same action to re-lock the fore-and-aft bar in its forward position.

As has previously been stated, the press platens are adapted to detachably hold interchangeable mold sections of different sizes, and with this object in view, all of the molds of the series are made of standardized internal diameter and thickness and with different external diameters. In order to permit of rapid connection of the drain pipe to the swinging steam-jacketed mold sections, and to compensate for differences in diameters, a threaded nipple is used having spherically ground joints at its opposite ends adapted to respectively seat in correspondingly formed recesses or sockets in the upper mold sections and in the hinge pin which connects the platens. This hinge pin is provided with a longitudinal and a transverse bore for conducting water of condensation or exhaust steam from the telescoping nipple to a swivel joint on the end of the hinge pin, from which it flows or is drawn away to a steam trap or the like as usual.

The foregoing and other objects, features, and advantages of the invention will be readily understood from the following description in connection with the accompanying drawings, wherein the invention has been shown by way of illustration, and wherein Fig. 1 is a side elevation of one form of vulcanizing press embodying the invention;

Figure 1:
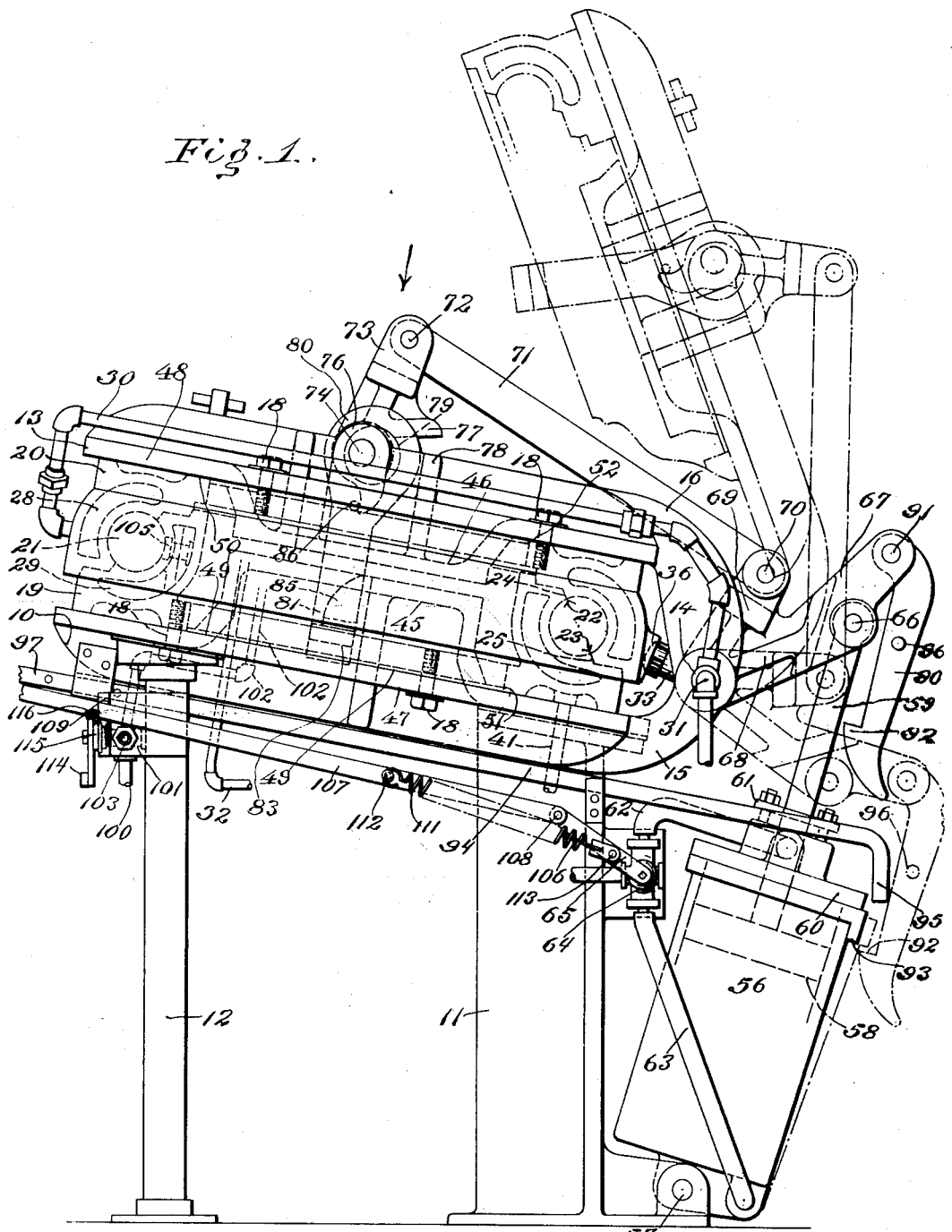

The improved vulcanizing press shown in the drawings comprises a lower fixed platen or bed 10, supported by standards or base members 11 and 12, and an upper swinging platen or bed 13, pivoted to the fixed platen by a pin or bolt 14 extending thru apertured ears 15 and 16 of the respective platens. The apertures in one pair of hinge ears are preferably elongated or in the nature of slots 17 to permit slight freedom of movement of the upper platen 13 in a direction parallel to its axis, so as to facilitate the seating and unseating of the mold sections as will hereinafter be explained.

Secured to the respective platens 10 and 13, as by cap screws 18, is a pair of opposed annular mold sections 19 and 20, the meeting faces of which are grooved to provide a continuous annular mold cavity 21, within which an inner tube or similar article is confined during vulcanization. In the illustrated embodiment of the invention (see particularly Fig. 5), the mold cavity 21 is circular in cross section and is equally divided between the two mold sections 19 and 20, the parting lines of which, at the inner and outer peripheries, intersect the mold cavity at diametrically opposite points 22 and 23, respectively, located on opposite sides of, and of course at equal distances from, the central circumferential plane of the mold. In other words, said parting lines intersect the cavity 21 circumferentially in such a manner as to define a truncated cone whose sides pass diagonally thru the center of the mold cavity and whose apex is located in the direction of the opening movement of the movable section 20 as it is carried upwardly by the platen 13. With this arrangement, it will be observed that the lower mold section 19 presents a side wall to engage the green or unvulcanized tube thruout the major portion of its radial extent, and an overhanging inner wall to engage the tube thruout its base or the major portion of its axial extent. The meeting faces of the two mold sections extend obliquely from the points 22 and 23 as indicated at 24 and 25 (Fig. 5) thru part of the mold wall, and thence are offset in planes 26 and 27, located at opposite sides of but parallel to the central circumferential plane. The beveled or inclined portions 24 and 25 form a tapered bore fit serving to accurately register the mold sections when in closed relation, and thus provide a fluid-tight joint to prevent the formation of rinds or fins on the vulcanized tube, the flat or parallel portions 26 and 27 being slightly spaced apart to provide the necessary clearance. This particular form of mold per se, which is designed especially for vulcanizing inner tubes, forms the subject of my pending application Serial No. 263,623, filed March 22, 1928, to which reference may be had for further details.

Figure 4:
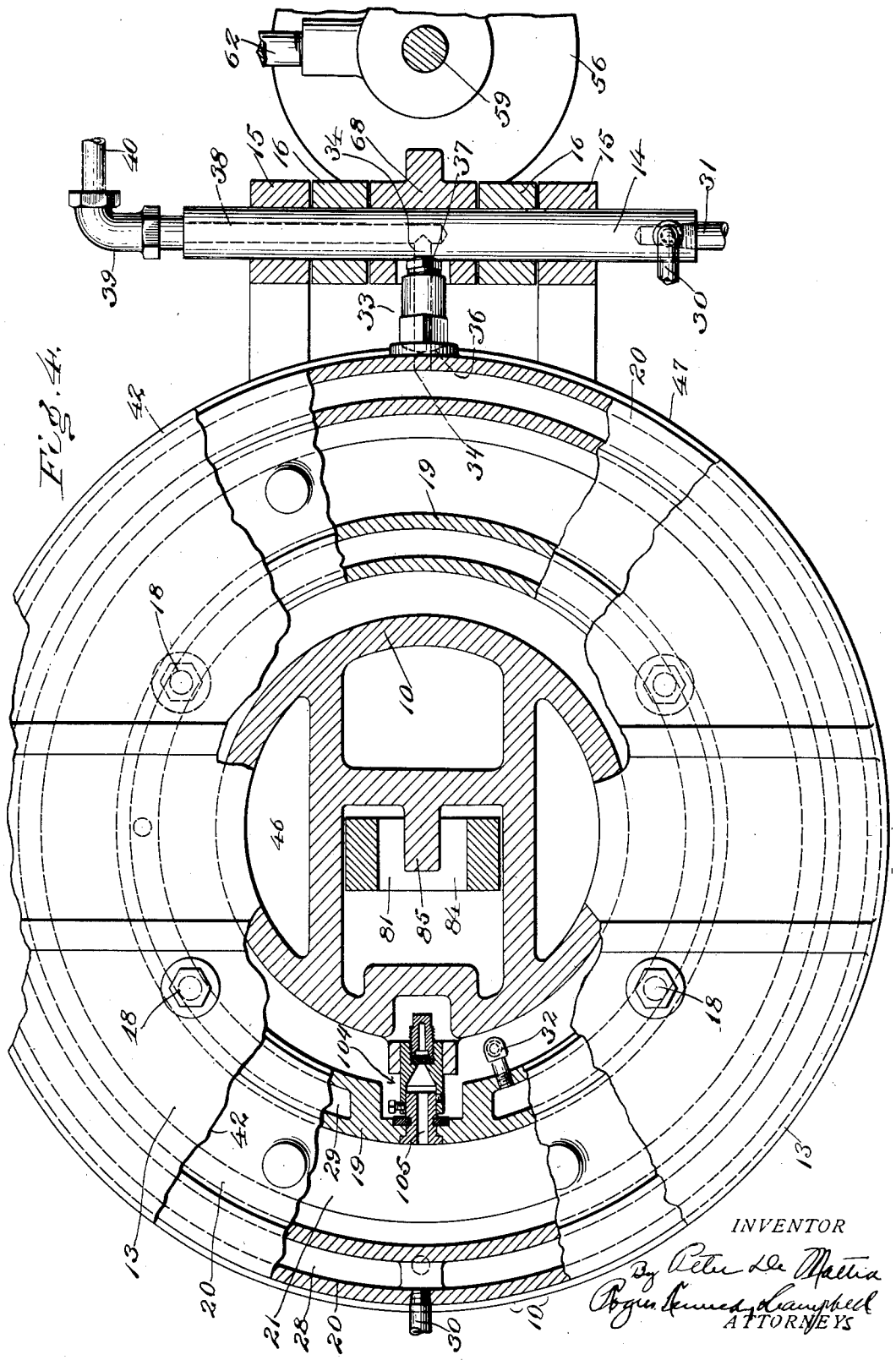
Fig. 4 is an enlarged top plan view of the press without the opening and closing mechanism, and with parts broken away and parts in section.

The mold sections 19 and 20 (rather than the press platens) are individually heated by the circulation of steam or other heating fluid thru heating chambers or jackets 28 and 29, which surround the mold cavity 21, such steam being supplied to the upper heating chamber 28 thru a pipe 30 having a swivel joint 31 at one end of the hinge pin 14, and to the lower heating chamber 29 thru a pipe 32 (see Fig. 1). In order to drain the upper heating chamber 28, a longitudinally adjustable nipple 33 (Figs. 4 and 5) provides communication between a radial port 34 in the mold section 20 and a similar radial port 35 which extends transversely into the hinge pin 14. At the outer ends of said ports 34 and 35, and concentric therewith, the mold section 20 and the hinge pin 14 are provided with spherically ground recesses 36 and 37, respectively, within which the ends of the threaded nipple 33 are adapted to seat, making a fluid-tight joint. The hinge pin 14 is further characterized (Fig. 4) by a substantially central bore 38 extending inwardly from one end of the pin and intersecting the transverse port 35, and a swivel joint 39 is associated with the end of the hinge pin to provide communication between the bore 38 and a pipe 40, which carries the water of condensation to a trap or the like not shown. Another drain pipe 41 (Fig. 1) preferably is screwed directly into the lower mold section 19 to drain the heating chamber 29. By providing the mold sections directly with heating jackets, a better and more uniform cure is obtained, and this especially when molds of different sizes are to be interchanged.

Figure 5:
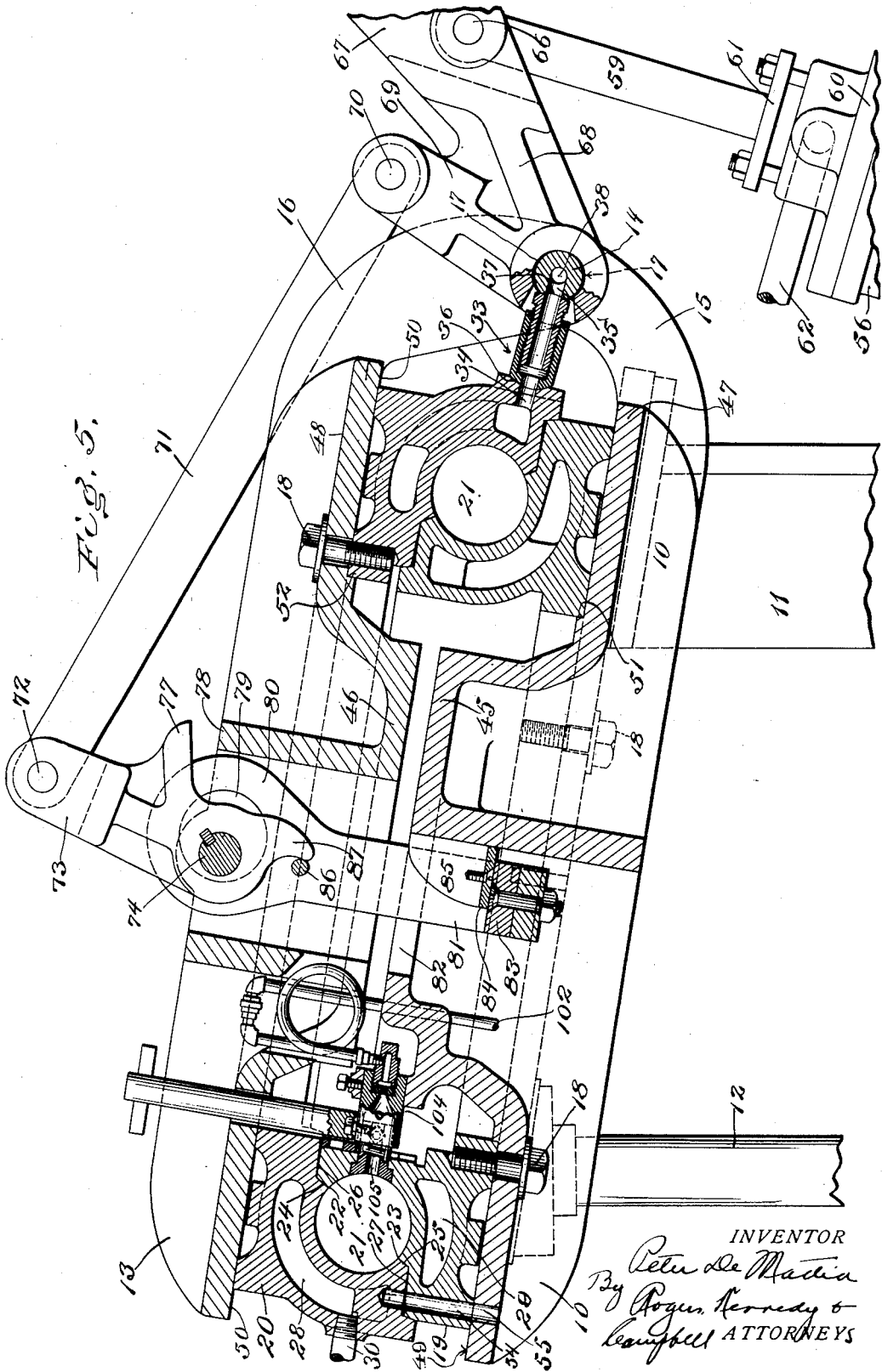
Fig. 5 is a vertical transverse sectional view, on an enlarged scale, taken on line 5—5 of Fig. 3.

In the preferred embodiment of the invention illustrated, the platens 10 and 13, respectively, comprise central web portions 45 and 46, which are relatively close together when the press is closed, and offset annular table or flange portions 47 and 48 which are parallel to each other and have their opposing faces 49 and 50 machined and spaced apart a distance equal to the thickness of a pair of mold sections (Fig. 5). This dimension is standardized for molds of different sizes, as are also the internal diameters of the mold sections, which seat against annular shoulders 51 and 52, whereby they are easily positioned in axial alinement with the platens. In view of the fact that the external diameters of the mold sections vary in accordance with the size of the tube or tire being produced, the threaded nipple 33 above described is particularly advantageous, as it compensates for such variations and provides a connection which can be quickly made and broken. Any number of cap screws 18 may be employed for detachably securing the mold sections to their respective platens, and in order to properly line up the screw holes, as well as to position the mold sections in proper radial relationship to the platens, the mold sections are provided, adjacent their front edges (Fig. 5), with transverse bores 54 adapted to be alined with an opening 55 in the fixed platen 10 by means of a drift pin or the like.

In order to move the platen 13 and its mold section 20 to open and closed positions, and to lock and unlock the press, the following novel means are provided. A pressure cylinder 56 (Fig. 1) has its lower end pivoted to the standard 11, as at 57, and is provided with a reciprocating piston 58 secured to a piston rod 59 which extends thru the upper cylinder head 60 and stuffing box 61. A suitable pressure fluid, such as water, steam, or compressed air, is admitted to the cylinder 56 alternately at opposite sides of the piston 58 thru flexible conduits 62 and 63 under the control of a four-way valve 64, which is manually operated by a handle or rod 65 extending forwardly to a position convenient for manipulation by the operator. The upper end of the piston rod 59 is connected, as at 66, to the longer arm 67 of a bell-crank lever 68, mounted to rock upon the hinge pin 14, and whose shorter arm 69 is pivoted at 70 to one end of a link 71. This link 71 extends inwardly over the upper platen 13 and has its other end pivoted at 72 to a lever arm 73 extending upwardly at or near the center of the press. Said lever arm 73 is fast to a rock shaft 74, journaled at 75 and 76 at the top of the platen 13 (Fig. 3), and is characterized by an extension or lug 77 on its rearward side which is adapted to abut against a fixed stop portion 78 (Fig. 5) to limit the rocking movement of the lever with reference to the swinging mold section. A pair of eccentrics 79 is provided on the rock shaft 74 to support the spaced straps 80 of a U-shaped latch or clamping member 81, which depends thru a substantially central opening 82 in the fixed platen 10, and which is provided at its lower end with a detachable wear block 83 adapted to engage against the underside of a similar wear plate 84 at the lower end of a locking lug 85 on said fixed platen. In order to swing the locking member or latch 81 into and out of engagement with the lug 85, the latch straps are provided with a rigid cross pin 86 disposed in the path of movement of a toe portion 87 of the lever arm 73, and said pin is maintained against said toe portion by the gravitating action of the latch member. Consequently, as the platen 13 comes to rest in its closing movement, the latch member 81 swings by gravity under the locking lug 85 and is then drawn upwardly by the eccentrics 79 with a powerful clamping pressure. In the opening operation, the lost motion of the lever arm 73 with reference to the movable platen 13 permits the latch member 81 to be disengaged from and swung clear of the lug 85 by the contact of the toe portion 87 with the pin 86, before the lever extension 77 comes into contact with the fixed stop portion 78 of the platen, after which the upward swinging of the platen is effected as if the lever arm 73 were formed integrally with the platen.

From the foregoing construction, it will be apparent that the pressure cylinder 56 not only acts to raise and lower the upper swinging platen 13 in opening and closing the press but it also serves by the pressure which it exerts thru its connections with the platen to hold the latter firmly and securely in its closed position. While the pressure thus exerted by the cylinder is or could be made great enough to clamp the swinging platen in its closed position, especially when the tube undergoing vulcanization is inflated under a relatively low pressure, the cylinder pressure in the embodiment illustrated is greatly multiplied by the employment of the lever arm 73 and the eccentrics 79 thru which the cylinder pressure is transmitted to the clamping member 81.

It is desirable to lock the swinging platen and its mold section in open position in order to prevent its accidental or premature closing, and for this purpose a dog 90 (Fig. 1) is pivotally suspended at 91 on the long arm 67 of the bell-crank lever above the pressure cylinder 56. Adjacent its lower end, the dog 90 is provided with a shouldered projection 92 which, when the press is opened, is adapted to slide past and catch below a shoulder 93 on the upper end of the cylinder 56, the dog being influenced by gravity to effect this engagement automatically. Thus when the press is opened, it will be held open independently of the fluid pressure in the cylinder, and cannot be closed again until the dog has been released. Its release is effected by means of a second-hand bar 94 (see also Fig. 2), which is longitudinally slidable below the fixed platen 10 and which has its rearward end bent downwardly as at 95 whereby to engage against a projecting pin 96 carried by the dog 90. The forward end 97 of the bar 94 is accessible as a handle at the front of the press, and by it the bar can be pushed rearwardly, when desired, to release the projection 92 from its engagement with the shoulder 93. Then the valve 64 can be manipulated to supply pressure fluid to the lower side of the cylinder 56 causing the press to be closed. A spring 94ª (Fig. 2), attached at one end to the lower platen 10 and at its opposite end to the bar 94, pulls constantly on the bar to hold it in its forward inactive position.

Figure 2:
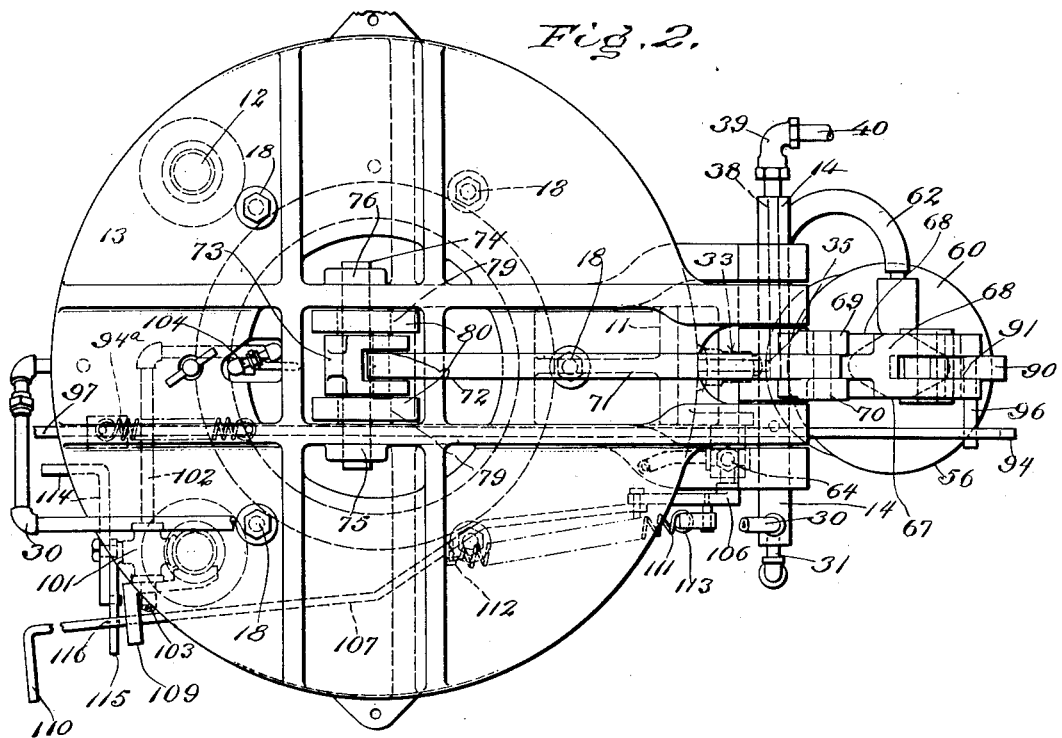
Fig. 2 is a top plan view thereof.
Figure 3:
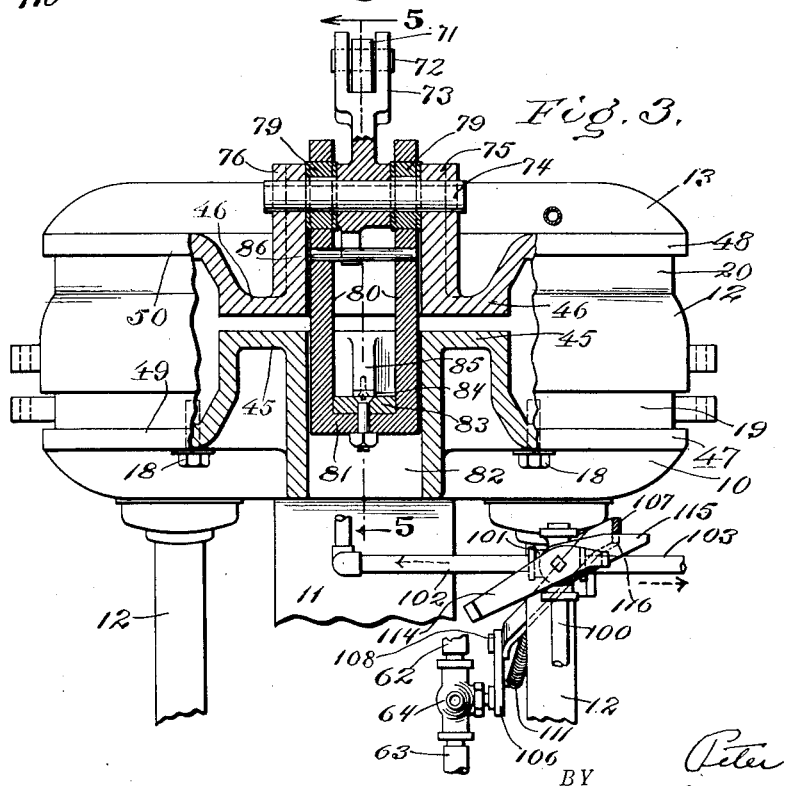
Fig. 3 is a fragmentary front view with parts broken away and parts in section to show the locking mechanism more clearly.

Compressed air, or other fluid under pressure, is supplied, for inflating the tube within the mold cavity 21, from a pipe 100, the inflation and deflation of the tube being controlled by a four-way valve 101, which selectively provides communication between the supply pipe 100 and pipe 102, and between said pipe 102 and an exhaust pipe 103 (Figs. 1, 2 and 3). The pipe 102 extends upwardly thru the fixed platen 10 and is provided at its extremity with suitable coupling means 104 (Fig. 5) by which it may be connected to the inner tube valve stem which projects thru a bushing 105 in the wall of the mold section 10. The coupling means 104, specifically illustrated in the drawings, is one which has been developed to make a quick and fluid-tight connection with the valve stem, and is being made the subject matter of a separate application for patent for vulcanizing molds for inner tubes and the like, Serial No. 302,710, filed Aug. 29, 1928.

The pressure cylinder valve 64 and the tube inflation valve 101 are manually operated independently, but are so coordinated as to require operation in a definite sequence for the reasons previously mentioned. Thus (Figs. 1, 2 and 3), the valve 64 has an arm or lever 106 by means of which its barrel may be rotated thru the instrumentality of a slidable bar 107 which is pivoted at 108 to the arm 106. This bar 107 is guided thru a bracket 109 at the front of the press and is offset at its forward end to provide a handle 110, by means of which it may be drawn forwardly against the action of a tension spring 111, having one of its ends connected to the bar 107 at 112, and its other end connected to the arm 106 as at 113. The bar 107 is slidable in a plane transverse to that of an operating lever 114 for the valve 101 and immediately above the same as best shown in Figs. 1 and 3, and said lever 114 has associated with it a keeper 115 which, when the press is closed, is adapted to engage in a notch 116 in the lower edge of the bar 107. This keeper is loosely mounted on the stem of the valve 101 and is adapted to be engaged at its under edge by a pin or offset portion of the lever 114. When the parts are in the respective positions shown in the drawings, the valve 64 has admitted pressure fluid to the lower end of the cylinder 56 thru the tube 63, and the valve 101 has admitted air from the supply pipe 100 to the pipe 102, inflating the tube or other article in the mold cavity. While the article is thus inflated, the bar 107 is locked in its forward position by virtue of the engagement of the keeper 115 in the notch 116. In this condition, the keeper 115 is held up against the action of gravity by the pressure of the forward edge of notch 116 against the front surface of the keeper, such pressure being exerted on the rod 107 by the spring 111. This pressure can be overcome by a slight forward pull on the rod 107, or the keeper can be manually pushed out of the notch if the operator desires to disengage it in that way. In order to turn the valve 64 to admit fluid to the upper end of the cylinder whereby to open the press, it is first necessary to move the lever 114 in a clockwise direction as viewed in Fig. 3, and thereby turn the valve 101 with it to deflate the article. The keeper 115 will or may continue, by its engagement in the notch 116, to hold the fore-and-aft bar 107 in its forward position, but the operator may readily disengage the keeper by pushing downwardly thereon or by pulling the bar 107 forwardly sufficiently to release the tension of the spring 111 on the keeper and thus allow it to fall by gravity, whereupon the spring acts instantly to move the bar rearwardly and turn the valve 64 with it to admit pressure to the upper side of the piston 58 for the opening of the press. Conversely, in closing the press, the bar 107 is first drawn forwardly to admit the pressure fluid to the lower side of the piston 58, such forward movement of the bar presenting the notch 116 in registration with the keeper 115, which is then re-engaged with the notch as the lever 114 is actuated in a counter-clockwise direction in Fig. 3 to turn the valve 101 for the inflation of the tube.

The general operation of the press is as follows:
After the article has been deflated and pressure fluid admitted to the upper end of the cylinder 56, the piston 58 and rod 59 move downwardly, rocking the bell-crank lever 68 in a clockwise direction as viewed in Figs. 1 and 5 to unlock and open the press. The initial movement of the bell-crank lever 68 is transmitted by the link 71 to the arm 73, causing the U-shaped latch member 81 to be disengaged from the locking lug 85 in the manner before described, and after the projection 77 abuts against the stop 78, the platen 13 is swung upwardly to open position as indicated by the dotted lines in Fig. 1, in which position it is held by the safety dog 90. When the press is opened, the vulcanized tube or tire may be removed therefrom and a green or unvulcanized tube placed in the half mold cavity of the lower mold section 19. To insert the green tube, it is necessary to stretch the tube only a very slight amount, and its tension will naturally hold it to its seat. In closing the press the operator with one hand pushes rearwardly on the spring-actuated rod 94 to disengage the safety dog 90 and with his other hand pulls forwardly on the spring-actuated rod 107 to admit pressure air below the piston 58 and cause it, by its upward movement in the cylinder 56, to swing the platen 13 and mold section 20 downwardly to closed position. Both hands of the operator are thus required to close the press so that there is no danger of his hands becoming caught between the platens during the closing movement. In the final upward movement of the piston 58, which takes place after the section 20 has been seated against the fixed section 19, the latch member 81 is swung inwardly by gravitation and upwardly by the eccentrics 79 into engagement with the lug 85 and the press thereby securely locked together. The tube may then be fully inflated by operating the lever 114 to provide the desired internal vulcanizing pressure and the press locked against re-opening by the engagement of the keeper 115 in the notch 116 of the bar 107, it being understood that steam or other heating medium is circulated continuously thru the outside chambers 28 and 29.

It will be evident from the foregoing description that a substantial advance has been made in the art, by the provision of a simple and efficient vulcanizing press for economically producing inner tubes, tires, and similar articles. A series of molds for producing articles of different kinds or sizes may readily be interchanged and used in the same press, thus considerably reducing the initial cost of a complete vulcanizing equipment, as well as reducing the amount of floor space necessary for it. The novel locking mechanism is not restricted either as to location or the number of latch members employed, since a plurality of such latch members operated from a single link and lever arm, may be disposed in spaced relation around either the outer or inner periphery of the mold. Obviously the invention is susceptible of further modification in the details of construction and arrangement of parts, and the right is herein reserved to make such changes as fall within the scope of the appended claims without departing from the spirit of the invention.

Having thus described my invention, what I claim is:

1. A vulcanizing press comprising a pair of opposed platens hingedly connected together, and locking means comprising a clamping member pivoted to one of the platens adjacent the center thereof, a locking lug fixed to the other platen and adapted to be engaged by the free end of said clamping member, and means including an eccentric for swinging the clamping member into and out of locking engagement with said lug.

2. A vulcanizing press comprising a pair of opposed platens hinged with reference to each other, and mechanism for swinging one of said platens with reference to the other, said mechanism including an arm extending outwardly from the swinging platen, a bell-crank pivoted at the hinge connection, a link connecting said arm with one arm of the bell-crank, fluid-pressure means connected to the second arm of the bell-crank for actuating the same, and means operated by said swinging mechanism for locking the two platens together and disengaging them from locked engagement.

3. A vulcanizing press comprising a pair of opposed platens hinged with reference to each other, and mechanism for swinging one of said platens with reference to the other, said mechanism including an arm extending outwardly from the swinging platen and capable of lost motion with reference thereto, a bell-crank pivoted at the hinge connection, a link connecting said arm with one arm of the bell-crank, and fluid-pressure means connected to the second arm of the bell-crank for actuating the same, together with locking means associated with the first mentioned arm and operable thereby in its lost motion with respect to the movable platen.

4. A vulcanizing press comprising a fixed platen and a swinging platen hinged with reference thereto, a lever arm extending outwardly from the swinging platen and pivoted for lost motion with reference thereto, a bell-crank pivoted at the hinge connection, a link connecting said lever arm with one arm of the bell-crank, fluid-pressure means connected to the second arm of the bell-crank for actuating the same, a clamping member pivoted to the swinging platen, a lug fixed to the other platen and adapted to be engaged by said clamping member, and means connecting the clamping member for movement by said lever arm during the lost motion thereof.

5. A vulcanizing press comprising a fixed platen and a swinging platen, each platen containing a detachable mold section, a pressure cylinder, operating connections between said pressure cylinder and the swinging platen for opening and closing the press, means associated with said connections whereby the two platens comprising the press are held securely in the closed position, further means associated with said connections for releasing the two platens from engagement, and means intermediate the pressure cylinder and the swinging platen for locking the latter in the open position.

6. A vulcanizing press comprising a pair of platens, a hinge pin connecting the two platens, whereby one platen may be swung with reference to the other, a pressure cylinder, a lever arranged upon said hinge pin and connected with the pressure cylinder, connections between said lever and the swinging platen, and means connected with said lever adapted to be operated by gravity for locking the swinging platen in open position.

7. A vulcanizing press comprising a pair of platens, each having fastened thereto a detachable mold section, a hinge portion connecting the two platens, an adjustable connection between said hinge portion and one of said molds adapted for the passage of fluid, a pressure cylinder, a lever arranged upon said hinge portion connected with the pressure cylinder, and connections between said lever and one of said platens whereby one platen may be swung with reference to the other, and associated means operated from the pressure cylinder whereby the two platens may be locked together and released from locking engagement.

8. A vulcanizing press comprising a lower fixed platen and an upper swinging platen hingedly connected together, power-actuated mechanism including a pressure cylinder for raising and lowering the swinging platen to open and close the press, clamping means carried by the swinging platen and operated by the pressure cylinder for automatically locking and unlocking the two platens in the closing and opening of the press, respectively, and gravity actuated means to engage a portion of the cylinder for automatically locking the swinging platen in the open position.

9. In vulcanizing apparatus, a pair of opposed annular mold sections hingedly connected together, means for inflating and deflating an article confined between the mold sections when they are in closed relation, power mechanism including a pressure cylinder for swinging one of said mold sections toward and away from the other to close and open the mold, a fluid control valve for the pressure cylinder, and inter-connections between said fluid control valve and the inflating and deflating means to prevent their actuation in improper sequence.

10. In vulcanizing apparatus, a pair of opposed annular mold sections hingedly connected together and defining between them an annular mold cavity, means including a manually operable valve for inflating and deflating an article confined in said cavity, power mechanism including a pressure cylinder for swinging one of said mold sections toward and away from the other to close and open the mold, a fluid control valve for the pressure cylinder, and means connecting said fluid control valve with the manually operable inflation valve to insure their actuation in proper sequence.

11. In vulcanizing apparatus, a pair of opposed annular mold sections hingedly connected together and defining between them an annular mold cavity, means including a manually operable valve for inflating and deflating an article confined in said cavity, power mechanism including a pressure cylinder for swinging one of said mold sections toward and away from the other to close and open the mold, a separate manually operable valve to control admission and exhaust of fluid to the pressure cylinder, and interconnections between the two valves to insure their actuation in proper sequence.

12. In a vulcanizing press, a lower fixed platen and an upper movable platen hingedly connected to the rear edge thereof, power mechanism including a pressure cylinder for swinging the movable platen upwardly from the fixed platen to open the press, a pivoted dog at the rear of the press and movable with the movable platen to lock it automatically in its open position, and means extending to the front of the press to manually release said dog.

13. In a vulcanizing press, a pair of opposed platens hinged with reference to each other, one of said sections being fixed and the other movable, an arm extending outwardly from the movable section, a bell-crank pivoted at the hinge connection, a link connecting said arm with one arm of the bell-crank, means including a rocking pressure cylinder connected to the second arm of the bell-crank for actuating the same, and a dog pivoted on the bell-crank and adapted to automatically engage a shoulder on the pressure cylinder to hold the movable platen in open position.

14. A vulcanizing press comprising a lower fixed platen and an upper swinging platen, power mechanism including a pressure cylinder for raising and lowering the upper swinging platen to open and close the press, a fluid control valve for the pressure cylinder, a manually operated element for actuating said control valve, a spring for normally holding the valve in closed condition, an automatic safety device for locking the swinging section in its raised position, a second manually operated element for releasing the safety device, and a spring connected to the last mentioned element for normally holding it in inactive position; whereby the operator is required to employ both hands in closing the press.

15. A vulcanizing press comprising a pair of opposed platens hinged with reference to each other, a pair of steam-jacketed mold sections detachably mounted on said platens, a steam connection associated with the platen hinge, and a longitudinally adjustable fluid conductor leading to the hinge and one of the jacketed mold sections, as and for the purpose set forth.

16. A vulcanizing press comprising a pair of opposed platens connected together by a hinge pin, a pair of steam-jacketed mold sections detachably mounted on the respective platens, one of said mold sections being movable about the axis of the hinge pin and having a port from its steam jacket to a position facing the hinge pin, and having a spherically ground recess at the outer end of said port, the hinge pin having a longitudinal bore in communication with a drain pipe, and an intersecting transverse bore in line with said port in the mold section, and the pin also having a spherically ground recess surrounding the outer end of its transverse bore, and a longitudinally adjustable fluid conductor having opposite spherically formed ends seated in the spherically ground recesses of the respective parts.

PETER DE MATTIA.